United States Patent
Garrison

(10) Patent No.: US 9,850,770 B2
(45) Date of Patent: Dec. 26, 2017

(54) INTERSHAFT SEAL WITH ASYMMETRIC SEALING RING

(71) Applicant: Stein Seal Company, Kulpsville, PA (US)

(72) Inventor: Glenn M. Garrison, Perkiomenville, PA (US)

(73) Assignee: Stein Seal Company, Kulpsville, PA (US)

( * ) Notice: Subject to any disclaimer, the term of this patent is extended or adjusted under 35 U.S.C. 154(b) by 0 days.

(21) Appl. No.: 15/508,950

(22) PCT Filed: May 19, 2016

(86) PCT No.: PCT/US2016/033165
§ 371 (c)(1),
(2) Date: Mar. 6, 2017

(87) PCT Pub. No.: WO2016/179608
PCT Pub. Date: Nov. 10, 2016

(65) Prior Publication Data
US 2017/0314407 A1    Nov. 2, 2017

Related U.S. Application Data

(60) Provisional application No. 62/329,590, filed on Apr. 29, 2016.

(51) Int. Cl.
*F01D 11/00* (2006.01)
*F16J 15/44* (2006.01)

(52) U.S. Cl.
CPC .......... *F01D 11/003* (2013.01); *F16J 15/442* (2013.01); *F05D 2240/60* (2013.01)

(58) Field of Classification Search
CPC ..... F01D 11/003; F01D 11/025; F16J 15/442; F16J 15/441; F05D 2240/60

(Continued)

(56) References Cited

U.S. PATENT DOCUMENTS

| 1,033,237 | A | * | 7/1912 | DeFerranti | ............ | F01D 11/005 |
| | | | | | | 277/416 |
| 3,124,502 | A | * | 3/1964 | Radke | ...................... | F16J 15/20 |
| | | | | | | 277/536 |

(Continued)

FOREIGN PATENT DOCUMENTS

| GB | 190824936 A | 11/1909 |
| GB | 2097490 A | 11/1982 |

*Primary Examiner* — Eugene G Byrd
(74) *Attorney, Agent, or Firm* — Michael Crilly, Esq.

(57) ABSTRACT

An intershaft seal assembly for use between an inner shaft and an outer shaft rotatable within a turbine engine is presented. The seal assembly includes a sealing ring, an inner ring, and a pair of end rings. The sealing ring further includes a plurality of asymmetric ring segments whereby each asymmetric ring segment further includes a vertical flange and a pair of horizontal flanges extending from the vertical flange in a non-symmetric arrangement. The non-symmetric seal geometry provides an axial force balance thereby reducing wear and increasing seal life. The sealing ring is disposed about the inner ring. The inner ring includes a plurality of ridges that engage the asymmetric ring segments so as to prevent rotation of the asymmetric ring segments with respect to the inner shaft. The end rings are disposed about the sealing ring and the inner ring. The horizontal flanges separately contact the end rings so that the vertical flange extends from and between the end rings in the direction of the outer shaft. A non-contact seal is formed between an outer sealing surface along the vertical flange and an inner sealing surface along the outer shaft.

19 Claims, 12 Drawing Sheets

(58) Field of Classification Search
USPC ..... 277/585, 305, 579, 580, 581; 415/170.1, 415/173.3, 174.2
See application file for complete search history.

(56) References Cited

U.S. PATENT DOCUMENTS

| | | | | |
|---|---|---|---|---|
| 3,813,103 | A * | 5/1974 | Wiese | F16J 15/3412 277/361 |
| 4,211,424 | A * | 7/1980 | Stein | F01D 11/003 277/352 |
| 4,405,134 | A * | 9/1983 | Sargent | F01D 11/025 277/422 |
| 4,750,746 | A * | 6/1988 | Boudot | F01D 11/00 277/578 |
| 4,752,077 | A * | 6/1988 | Hoffelner | F16J 15/162 277/367 |
| 5,403,019 | A | 4/1995 | Marshall | |
| 5,603,510 | A * | 2/1997 | Sanders | F01D 11/025 277/413 |
| 6,070,881 | A * | 6/2000 | Longree | F16J 15/40 277/409 |
| 6,109,617 | A * | 8/2000 | Laney | F16J 15/342 277/369 |
| 6,378,873 | B1 * | 4/2002 | Mayer | F16J 15/28 277/355 |
| 6,431,550 | B1 * | 8/2002 | Tong | F16J 15/442 277/346 |
| 6,547,522 | B2 * | 4/2003 | Turnquist | F01D 11/122 415/173.3 |
| 6,622,490 | B2 * | 9/2003 | Ingistov | F01D 11/001 277/355 |
| 6,715,766 | B2 * | 4/2004 | Kirby, III | F16J 15/441 277/411 |
| 7,055,826 | B2 * | 6/2006 | Stewart, Jr. | F16C 33/76 277/358 |
| 7,140,109 | B2 * | 11/2006 | Dourlens | F16C 17/03 29/898.02 |
| 7,287,956 | B2 * | 10/2007 | Bracken | F01D 5/225 415/173.3 |
| 7,549,834 | B2 * | 6/2009 | Kirchhof | F04D 29/102 415/1 |
| 7,726,940 | B2 * | 6/2010 | Snowsill | F16J 15/442 277/413 |
| 7,918,461 | B1 * | 4/2011 | MacGregor | F01D 11/025 277/413 |
| 8,100,403 | B2 | 1/2012 | Short | |
| 8,113,771 | B2 * | 2/2012 | Turnquist | F01D 11/025 277/411 |
| 8,205,891 | B2 * | 6/2012 | Vasagar | F01D 11/003 277/579 |
| 8,348,280 | B2 | 1/2013 | Pandey et al. | |
| 8,356,821 | B2 * | 1/2013 | Freal | F16J 15/162 277/578 |
| 8,459,653 | B2 | 6/2013 | Zheng | |
| 8,820,752 | B2 * | 9/2014 | Garrison | F01D 11/003 277/579 |
| 8,888,104 | B2 | 11/2014 | Garrison | |
| 8,888,441 | B2 | 11/2014 | Jordy et al. | |
| 8,967,627 | B2 | 3/2015 | Jahn et al. | |
| 9,004,495 | B2 | 4/2015 | Vasagar | |
| 2005/0206249 | A1 * | 9/2005 | Hashiba | F16J 15/26 310/54 |
| 2006/0151958 | A1 | 7/2006 | Chevrette et al. | |
| 2007/0053772 | A1 * | 3/2007 | Couture, Jr. | F01D 11/001 415/173.3 |
| 2007/0085278 | A1 * | 4/2007 | Davis | F01D 25/183 277/411 |
| 2007/0090606 | A1 * | 4/2007 | Ross | F04B 15/08 277/500 |
| 2009/0051124 | A1 * | 2/2009 | Kakehi | F16J 15/441 277/581 |
| 2010/0164180 | A1 | 7/2010 | Short | |
| 2012/0243977 | A1 * | 9/2012 | Simonet | F01D 9/041 415/173.3 |
| 2012/0261887 | A1 * | 10/2012 | Vasagar | F01D 11/003 277/543 |

\* cited by examiner

INTERSHAFT SEAL WITH ASYMMETRIC SEALING RING

CROSS REFERENCE TO RELATED APPLICATIONS

This application is a National Phase of PCT Application No. PCT/US2016/033165 filed May 19, 2016 entitled Intershaft Seal with Asymmetric Sealing Ring which further claims priority from U.S. Provisional Application No. 62/329,590 filed Apr. 29, 2016 entitled Segmented Asymmetric Seal. The subject matters of the prior applications are incorporated in their entirety herein by reference thereto.

FEDERALLY SPONSORED RESEARCH AND DEVELOPMENT

None.

BACKGROUND OF THE INVENTION

1. Field of the Invention

The invention generally relates to a sealing assembly and more particularly is concerned, for example, with an intershaft seal for use between rotatable shafts within a turbine engine.

2. Background

Intershaft seals are often employed between co-rotating or counter-rotating shafts within a gas turbine engine.

FIGS. 1a and 1b describe two exemplary intershaft seal assemblies 1 whereby a carbon graphite seal element 2 is pushed into an outer shaft 10 so as to rotate with the outer shaft 10 relative to an inner shaft 9. Radial loads along the seal element 2 are influenced by the pressure between the inner and outer shafts 9, 10 and centrifugal forces acting on the seal element 2. Axial loads along the seal element 2 are influenced by the pressure differential between the higher and lower pressure sides about the seal assembly 1. The seal element 2 is designed to induce an outward radial load sufficiently adequate to prevent the axial load from moving the seal element 2 in the direction of the lower pressure side.

In FIG. 1a, a seal assembly 1 is shown including a ring-shaped seal element 2 and spacer ring 6 interposed between a pair of end rings 3, 4. Seal element 2, spacer ring 6, and end rings 3, 4 are further interposed between an outer shaft 10 and an inner shaft 9. Each end ring 3, 4 has a generally rectangular-shaped cross section and is secured to the inner shaft 9 via a lock ring 5 threaded onto the inner shaft 9. The seal element 2 contacts the outer shaft 10. A gap 11 is interposed between the seal element 2 and the spacer ring 6. The gap 11 is sized to avoid contact between the inner diameter of the seal element 2 and the outer diameter of the spacer ring 6 during radial excursions or run-out of the inner shaft 9 and outer shaft 10. The spacer ring 6 may be secured to the end rings 3, 4 by at least one roll pin 8 that traverses a pin cavity 7 through the spacer ring 6 and end rings 3, 4.

In FIG. 1b, a seal assembly 1 is shown including a seal element 2 disposed within a ring-shaped gland 12 along an inner shaft 9. The seal element 2 contacts the outer shaft 10 so as to form a seal between the inner diameter of the outer shaft 10 and outer diameter of the seal element 2. The axial length of the gland 12 and width of the seal element 2 are sized to limit the axial clearance between the seal element 2 and the gland 12 so as to minimize leakage of a gas from the seal assembly 1.

In both seal assemblies 1, the seal element 2 is forced onto the rotating outer shaft 10 by centrifugal forces and pressure loading conditions so as to rotate with the outer shaft 10. In FIG. 1a, end rings 3, 4 rotate with the inner shaft 9 and limit axial translation of the seal element 2 along the inner shaft 9. In FIG. 1b, the walls of the gland 12 limit axial translation of the seal element 2.

Forces act on the seal element 2 from all sides. At the lower pressure side, a pressure drop from higher to lower pressure occurs from the inner diameter of the face groove to the outer diameter of the seal element 2. The centrifugal loading on the seal element 2 together with radial pressure loads produce a force at the interface between the seal element 2 and outer shaft 10. Axial translation of the seal element 2 is resisted by friction between the seal element 2 and outer shaft 10. For the seal element 2 to be in equilibrium, the difference in axial forces acting on the seal element 2 should be less than the friction force that opposes translation.

The coefficient of friction and pressure ratio greatly influences the performance of an intershaft seal assembly 1. If the coefficient of friction is not sufficient, then the pneumatic force acting on the seal element 2 in the axial direction could overcome the opposing frictional force. Accordingly, the coefficient of friction times the radial forces must be greater than the axial pressure force; otherwise, the pressure force will push the seal element 2 against the end rings 3, 4 or gland 12 causing the seal element 2 to wear and overheat.

Wear and heating remain a significant challenge for most intershaft seals. Fluid films are sometimes employed between a seal element 2 and the faces of the end rings 3, 4 or gland 12 to reduce wear; however, the films formed by Rayleigh pads and spiral grooves are often unable to overcome loading conditions typically encountered by intershaft seals. Furthermore, applications including fluid films must properly balance the leakage of gas within and from the seal system to avoid overheating conditions.

During a break-in period, a typical seal element 2 will wear as it contacts the end rings 3, 4 or gland 12. Break-in is completed when the axial clearance between the seal element 2 and the end rings 3, 4 or the gland 12 is equal to the combined axial run out of the end rings 3, 4 or the gland 12. After the break-in period, the wear rate sharply decreases. However, wear remains a substantial challenge when the relative axial translation between inner shaft 9 and outer shaft 10 is greater than the break-in wear clearance, causing the end rings 3, 4 or the gland 12 to "bump" the seal element 2 resulting in one revolution of wear per "bump".

In yet another example, FIG. 2 shows an intershaft seal described by Vasagar in U.S. Pat. No. 9,004,495 entitled Segmented Intershaft Seal Assembly. The seal assembly 13 includes a pair of end rings 15, 16, a carbon graphite seal element 14, an optional gap 19, and an optional spacer ring 18 radially interposed between an inner shaft 21 and an outer shaft 22 and axially interposed between a lock ring 17 and a ring-shaped flange 28. The seal element 14 rotates with the inner shaft 21 about an axis of rotation 24, rather than the outer shaft 10 as described for the seal assemblies 1 illustrated in FIGS. 1a and 1b.

Each end ring 15, 16 includes a flange 20, 23, respectively, forming a substantially inverted L-shaped cross section. End rings 15, 16 are disposed in a substantially symmetrical arrangement about the seal element 14 and contact the inner shaft 21 so that the flanges 20, 23 are arranged immediately adjacent to the outer shaft 22 without contact. This arrangement complements the inverted T-shaped cross section of the seal element 14. One end ring 15 is secured to the inner shaft 21 via a ring-shaped flange 28 and the other end ring 16 is secured via a lock ring 17 contacting the inner shaft 21.

The seal element 14 is interposed between the end rings 15, 16. The outer diameter of the spacer ring 18 is less than the inner diameter of the seal element 14 so as to provide a gap 19 between the two elements. The gap 19 avoids contact between the inner diameter of the seal element 14 and the outer diameter of the spacer ring 18 during excursions of the inner and outer shafts 21, 22. The faces of the seal element 14 and/or the spacer ring 18 may contact both end rings 15, 16.

The seal element 14 has an inverted T-shape cross-sectional profile. Centrifugal force drives the outer radial surfaces of the seal element 14 onto the overhang of the end rings 15, 16, thus allowing the seal element 14 to rotate with the inner shaft 21. An anti-rotation pin 29 is employed to secure the seal element 14 to one or both end rings 15, 16.

A clearance 26 is provided between the inner surface 27 along the outer shaft 22 and an outer surface 25 along the seal element 14. The clearance 26 avoids contact between the outer shaft 22 and seal element 14 and minimizes gas leakage across the seal element 14; however, contact between the seal element 14 and outer shaft 22 is possible due to radial excursions by or run-out of the inner and outer shafts 21, 22.

Although the seal assembly 13 minimizes wear to the seal element 14, stresses communicated onto the seal element 14 via the end rings 15, 16 and/or the anti-rotation pin 29 may cause the seal element 14 to fracture or otherwise fail thereby compromising sealing function.

As is readily apparent from the discussions above, the related arts do not include an intershaft seal capable of minimizing wear and heating during use while avoiding the fracture problem inherent to a sealing ring.

Accordingly, what is required is an intershaft seal capable of avoiding the wear, heat generation, and fracture problems inherent to currently known intershaft seals.

SUMMARY OF THE INVENTION

An object of the invention is to provide an intershaft seal capable of avoiding the wear, heat generation, and fracture problems inherent to currently known intershaft seals.

In accordance with embodiments of the invention, the seal assembly includes a sealing ring, an inner ring, and a pair of end rings. The sealing ring further includes a plurality of asymmetric ring segments. Each asymmetric ring segment further includes a vertical flange and a pair of horizontal flanges extending from the vertical flange in a non-symmetric arrangement. The inner ring is arranged so that the sealing ring is disposed about the inner ring. The inner ring includes a plurality of ridges that engage the asymmetric ring segments so as to prevent rotation of the asymmetric ring segments with respect to the inner shaft. The end rings are disposed about the sealing ring and the inner ring. The horizontal flanges separately contact the end rings so that the vertical flange extends from between the end rings in the direction of the outer shaft. A non-contact seal is formed between an outer sealing surface along the vertical flange and an inner sealing surface along the outer shaft.

In accordance with other embodiments of the invention, the inner shaft and the outer shaft counter-rotate.

In accordance with other embodiments of the invention, the inner shaft and the outer shaft co-rotate.

In accordance with other embodiments of the invention, two adjacent asymmetric ring segments contact along a joint.

In accordance with other embodiments of the invention, a tongue extends from a first end of one asymmetric ring segment and engages a groove along a second end of another asymmetric ring segment.

In accordance with other embodiments of the invention, the joint includes a gap between the first end and the second end adjacent to the tongue and one ridge traverses at least a portion of the gap.

In accordance with other embodiments of the invention, the seal assembly further includes a plurality of slots and a pad. The slots are separately disposed along the inner ring adjacent to the ridges. The pad extends radially inward from one horizontal flange along each asymmetric ring segment adjacent to each slot.

In accordance with other embodiments of the invention, the seal assembly further includes at least one channel. Each channel traverses the vertical flange along the asymmetric ring segment. Each channel includes an inlet and an outlet. The inlet is disposed at least partially above a first face along one end ring and is communicable with a higher pressure side. The outlet is communicable with a second face along another end ring adjacent to the lower pressure side.

In accordance with other embodiments of the invention, a first face along one end ring ensures a forward axial pressure communicates a forward axial force onto the asymmetric ring segment and a second face along another end ring ensures an aft axial pressure communicates an aft axial force onto the same asymmetric ring segment.

In accordance with other embodiments of the invention, the forward axial force is equal to the aft axial force.

In accordance with other embodiments of the invention, each horizontal flange includes an inner surface whereby a discontinuity separates one inner surface from another inner surface.

In accordance with other embodiments of the invention, the discontinuity is arranged to bisect the vertical ring.

In accordance with other embodiments of the invention, the inner sealing surface includes at least one groove set.

In accordance with other embodiments of the invention, the groove set includes at least two grooves. The grooves are disposed along the inner sealing surface so that at least one groove communicates gas onto the outer sealing surface along the vertical flange as the inner shaft translates with respect to the outer shaft.

In accordance with other embodiments of the invention, the groove set includes at least two grooves. The grooves are disposed along the inner sealing surface so that at least one groove communicates gas onto the outer sealing surface along the vertical flange as the outer shaft translates with respect to the inner shaft.

In accordance with other embodiments of the invention, an inlet groove communicates with each groove.

In accordance with other embodiments of the invention, the inner ring contacts the inner shaft.

In accordance with other embodiments of the invention, the inner ring is secured to at least one end ring via at least one pin.

In accordance with other embodiments of the invention, each pin engages a hole along a ridge.

Several advantages are offered by the invention. The invention avoids wear along a sealing ring caused by relative axial movement and contact between the sealing ring and a pair of end rings. The invention greatly reduces wear along the outer diameter of a seal ring caused by translation between an inner shaft and an outer shaft. The invention avoids friction-induced heating along a sealing ring caused by relative rotational movement at the contact between a sealing ring and a pair of end rings. The invention avoids fractures along a sealing ring induced by end rings and/or anti-rotation pins that otherwise constrain movement of the sealing ring.

BRIEF DESCRIPTION OF THE DRAWINGS

Additional aspects, features, and advantages of the invention will be understood and will become more readily apparent when the invention is considered in the light of the following description made in conjunction with the accompanying drawings.

DETAILED DESCRIPTION OF THE INVENTION

Figure 1A:
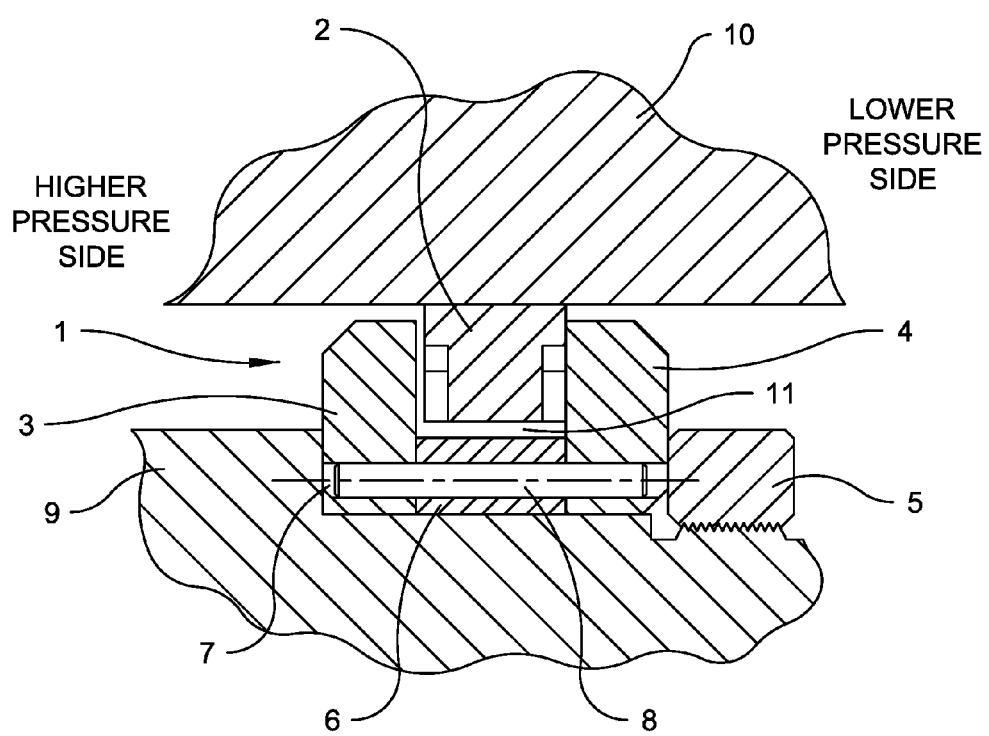
FIG. 1a is a cross sectional view of a prior art seal assembly including a sealing element interposed between a pair of end rings arranged between a pair of shafts.
Figure 1B:
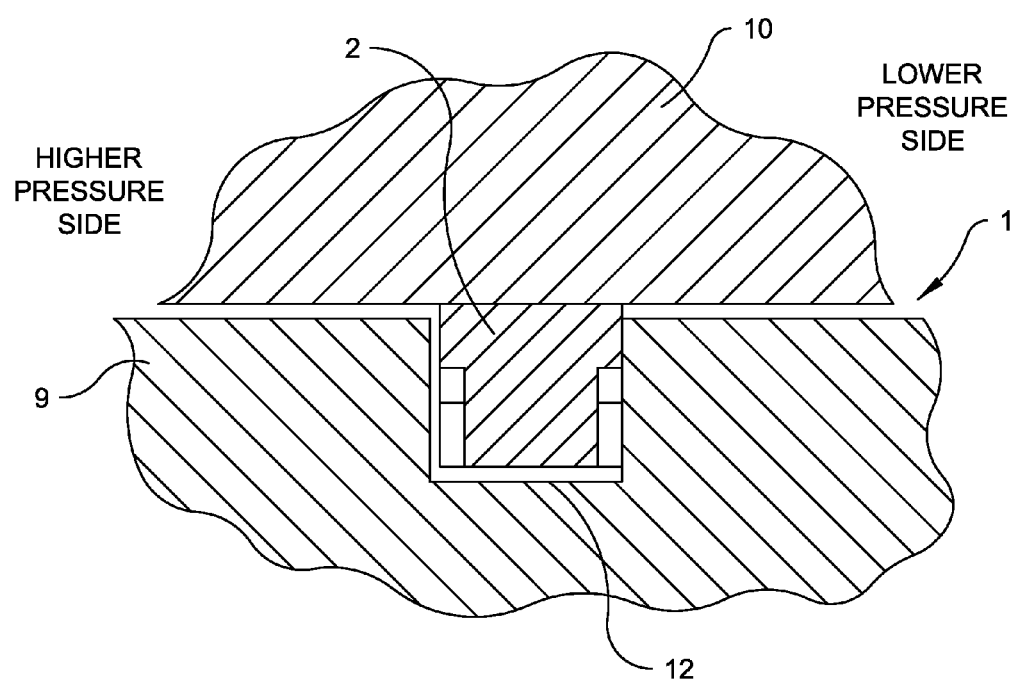
FIG. 1b is a cross sectional view of a prior art seal assembly including a sealing element disposed within a gland between a pair of rotating shafts.
Figure 2:
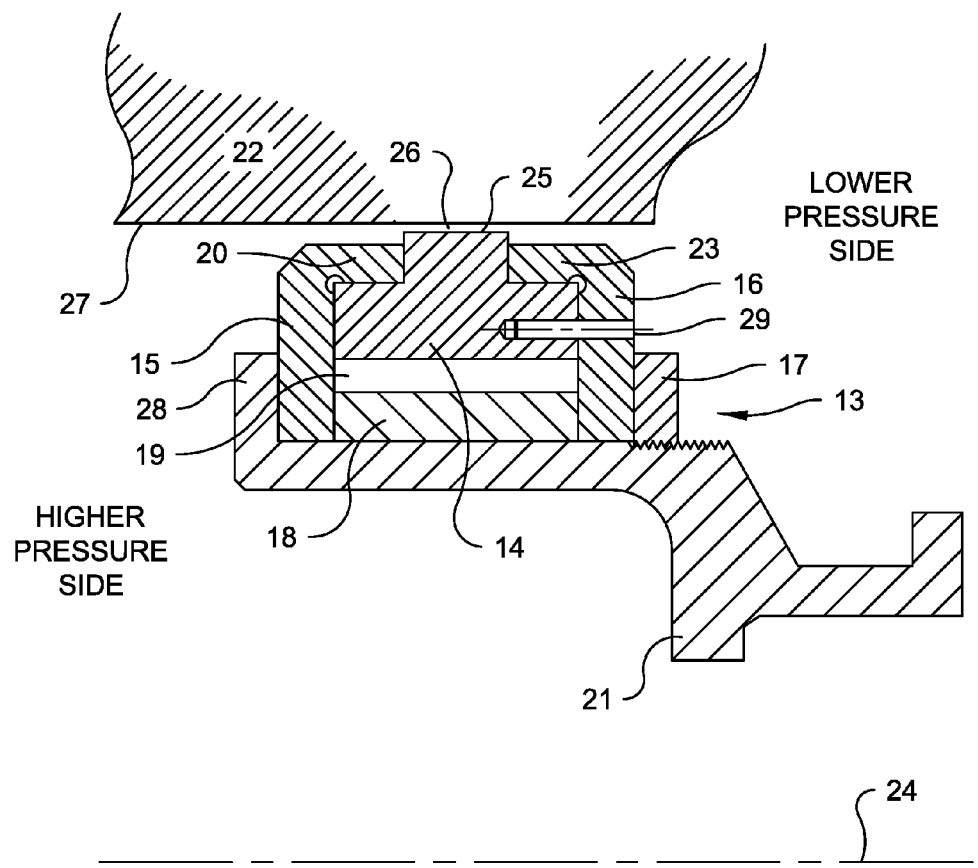
FIG. 2 is a cross sectional view of a prior art seal assembly with an inverted, symmetric T-shaped seal element disposed between a pair of shafts as described by Vasagar in U.S. Pat. No. 9,004,495 (features below the axis of rotation not shown).

Reference will now be made in detail to several preferred embodiments of the invention that are illustrated in the accompanying drawings. Wherever possible, same or similar reference numerals are used in the drawings and the description to refer to the same or like parts or steps. The drawings are in simplified form and are not to precise scale.

While features of various embodiments are separately described throughout this document, it is understood that two or more such features could be combined into a single embodiment.

Figure 3A:
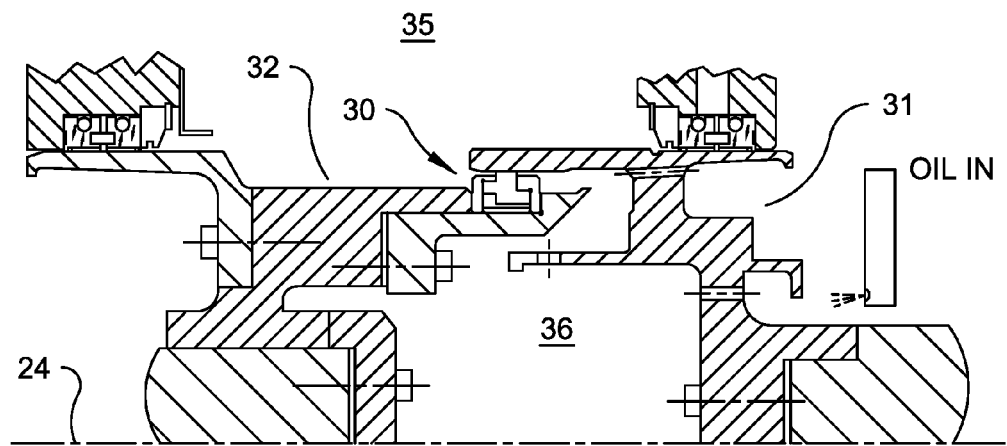
FIG. 3a is a cross section view illustrating a seal assembly with a segmented asymmetric seal disposed between a pair of rotatable shafts in accordance with an embodiment of the invention (features below the axis of rotation not shown).

Referring now to FIG. 3a, the seal assembly 30 is interposed between an outer shaft 31 an inner shaft 32. For purpose of the present invention, the terms outer shaft 31 and inner shaft 32 refer to separately rotatable structures within a turbine engine. The outer shaft 31 and the inner shaft 32 may be configured so that each rotates about an axis of rotation 24. The seal assembly 30 is secured to the inner shaft 32 via means understood in the art and rotatable therewith. The outer shaft 31 rotates about the inner shaft 32 in close proximity to the seal assembly 30 so that the seal assembly 30 sealingly engages the outer shaft 31. The seal assembly 30 prevents and/or minimizes fluid originating in a higher pressure side 35 from traversing between the seal assembly 30 and the inner shaft 32 and/or the seal assembly 30 and the outer shaft 31. The seal assembly 30 also prevents and/or minimizes fluid originating in a lower pressure side 36 from traversing between the seal assembly 30 and the inner shaft 32 and/or the seal assembly 30 and the outer shaft 31. In accordance with the functionality described herein, the seal assembly 30 therefore prevents and/or minimizes mixing between fluids that otherwise originate from the higher pressure side 35 and the lower pressure side 36.

While FIG. 3a illustrates particular designs for and an arrangement between an inner shaft 32 and an outer shaft 31, it is understood that other designs and arrangements are possible. In one non-limiting example, the inner shaft 32 and the outer shaft 31 may be configured so that only the end portions of each overlap as illustrated in FIG. 3a. In another non-limiting example, the inner shaft 32 may extend into and along at least a portion of the outer shaft 31. Regardless of the specific design for the inner shaft 32 and the outer shaft 31 and the arrangement there between, it is understood that the seal assembly 30 sealingly contacts the inner shaft 32 and is secured thereto to ensure the seal assembly 30 rotates with the inner shaft 32. It is also understood that the seal assembly 30 sealingly engages the outer shaft 31. Furthermore, it is understand that the outer shaft 32 and the inner shaft 31 may separately translate, that is move axially along the axis of rotation 24, such that the sealing engagement between the seal assembly 30 and the outer shaft 31 is likewise movable.

Figure 3B:
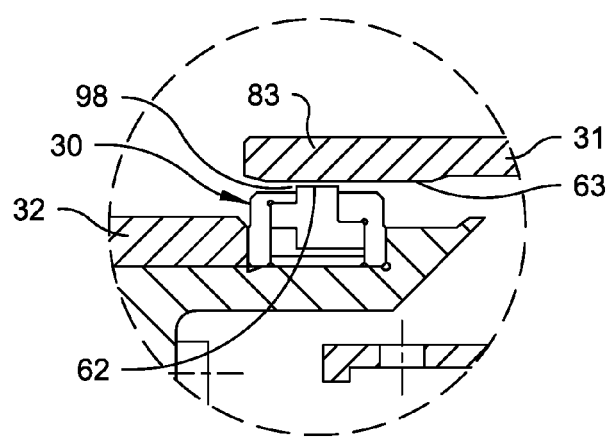
FIG. 3b is an enlarged cross section view illustrating a seal assembly with a segmented asymmetric seal providing a non-contact seal between an outer sealing surface along the asymmetric seal and an inner sealing surface along a runner of a rotatable shaft in accordance with an embodiment of the invention.

Referring now to FIG. 3b, one end of the inner shaft 32 may extend into and thereby engage the outer shaft 31 without direct contact there between. In some embodiments, the engagement between the inner shaft 32 and the outer shaft 31 may allow a portion of the inner shaft 32 to reside within a runner 83 extending from the outer shaft 31. The seal assembly 30 is therefore interposed between the inner shaft 32 and the runner 83. The seal assembly 30 may be secured about the outer diameter of the inner shaft 32 via means understood in the art so that an outer sealing surface 62 along the seal assembly 30 extends toward and sealingly engages an inner sealing surface 63 along the runner 83. This arrangement facilitates a non-contact seal between the outer sealing surface 62 and the inner sealing surface 63 whereby the outer sealing surface 62 is separated from the inner sealing surface 63 by a gap 98 that permits formation of a thin-film capable of resisting flow of a fluid between the higher and lower pressure sides 35, 36.

Figure 4:
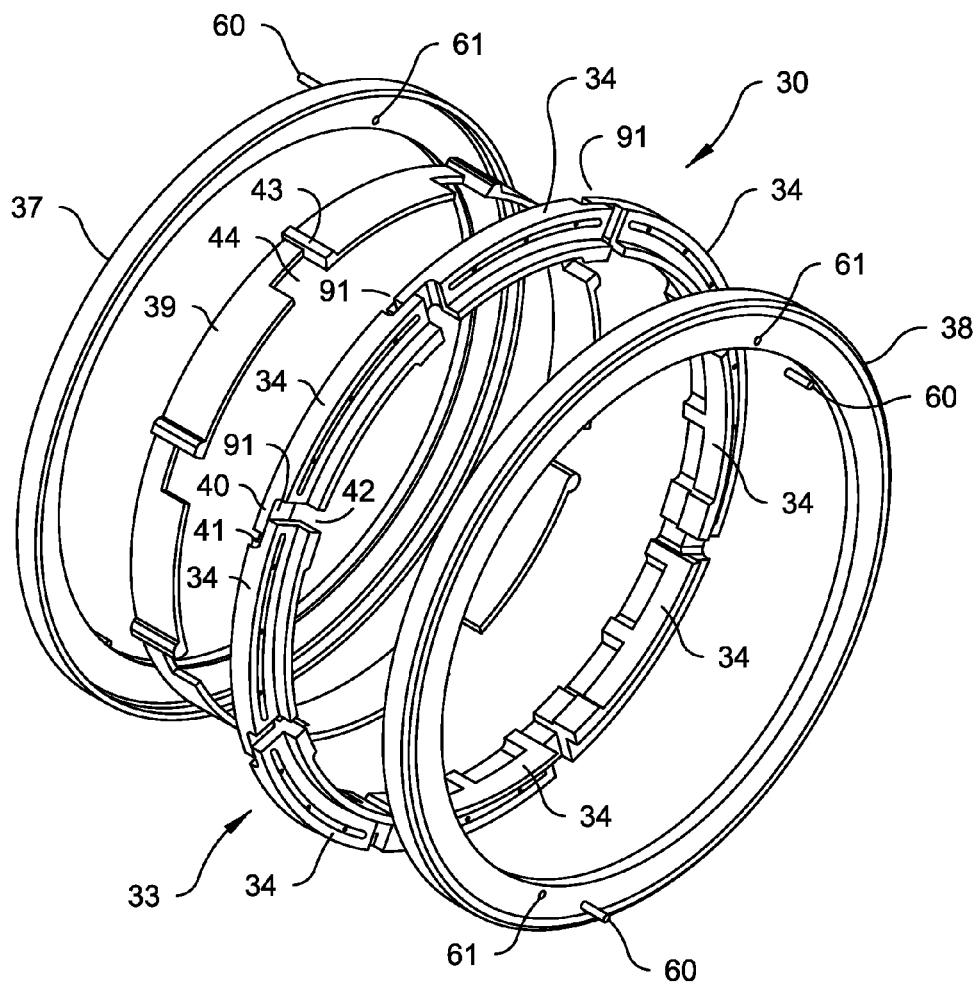
FIG. 4 is an exploded perspective view illustrating a plurality of asymmetric ring segments disposed about an inner ring between a pair of end rings in accordance with an embodiment of the invention.

Referring now to FIG. 4, the seal assembly 30 includes a sealing ring 33, an inner ring 39, and a pair of end rings 37, 38. The sealing ring 33 is disposed about and encircles the inner ring 39. Sealing ring 33 and inner ring 39 are interposed between the end rings 37, 38. This arrangement completely encloses the inner ring 39 by the sealing ring 33 and the end rings 37, 38 when secured to an inner shaft 32 (the latter not shown). This arrangement also partially encloses the sealing ring 33 by the end rings 37, 38 when secured to an inner shaft 32 (the latter not shown).

Referring again to FIG. 4, the sealing ring 33 comprises a plurality of asymmetric ring segments 34 disposed in an end-to-end arrangement to form a ring-shaped structure. Each asymmetric ring segment 34 is an arc-shaped element representing a segment of a circular ring. While the sealing ring 33 in FIG. 4 is comprised of six asymmetric ring segments 34, it is understood that two or more such asymmetric ring segments 34 may be required to completely define the circular-shaped sealing ring 33.

Referring again to FIG. 4, the interface between each adjacent pair of asymmetric ring segments 34 defines a joint 91. In preferred embodiments, the joint 91 should permit mechanical engagement between adjoining asymmetric ring segments 34. In one specific example, the joint 91 may include a tongue 40 that extends from the end of one asymmetric ring segment 34 into a groove 41 at the end of another asymmetric ring segment 34. The joint 91 may permit expansion of the sealing ring 33 when one or more asymmetric ring segments 34 moves away from the inner ring 39. With reference to the tongue 40 and groove 41 embodiment, expansion of the sealing ring 33 would have the tongue 40 pull away from the groove 41. The joint 91 may also permit contraction of the sealing ring 33 when one or more asymmetric ring segments 34 moves toward the inner ring 39. With reference to the tongue 40 and groove 41 embodiment, contraction of the sealing ring 33 would have the tongue 40 move into the groove 41.

Referring again to FIG. 4, the sealing ring 33 may include a plurality of gaps 42 and the inner ring 39 may include a plurality of ridges 43 and slots 44. Each gap 42 may extend across a joint 91 thereby physically separating a portion of the adjoining ends of two asymmetric ring segments 34. Each ridge 43 may extend axially across and radially outward from the inner ring 39. The ridge 43 may be configured so as to engage the gap 42. The ridge 43 may interact with the asymmetric ring segments 34 so as to provide a mechanical stop that limits or otherwise prohibits relative rotational motion between the asymmetric ring segments 34 and the inner ring 39. The ridge 43 may also provide a guide for outward and inward movement by the asymmetric ring segments 34 during expansion and contraction of the sealing ring 33. A slot 44 may be positioned adjacent to each ridge 43 so as to interact with other features along the sealing ring 33 as otherwise described herein.

Referring again to FIG. 4, each end ring 37, 38 may include one or more holes 61. Each hole 61 may be configured along the respective end ring 37, 38 to accept a pin 60. The pin 60 should be sufficiently long so as to traverses the depth of the hole 61 through the respective end ring 37, 38 and penetrate at least a portion of the inner ring 39. Contact between the pin 60 and both at least one end ring 37, 38 and the inner ring 39 may secure the end rings 37, 38 to the inner ring 39 so that the end rings 37, 38 and the inner ring 39 rotate with the inner shaft 32.

Figure 5:
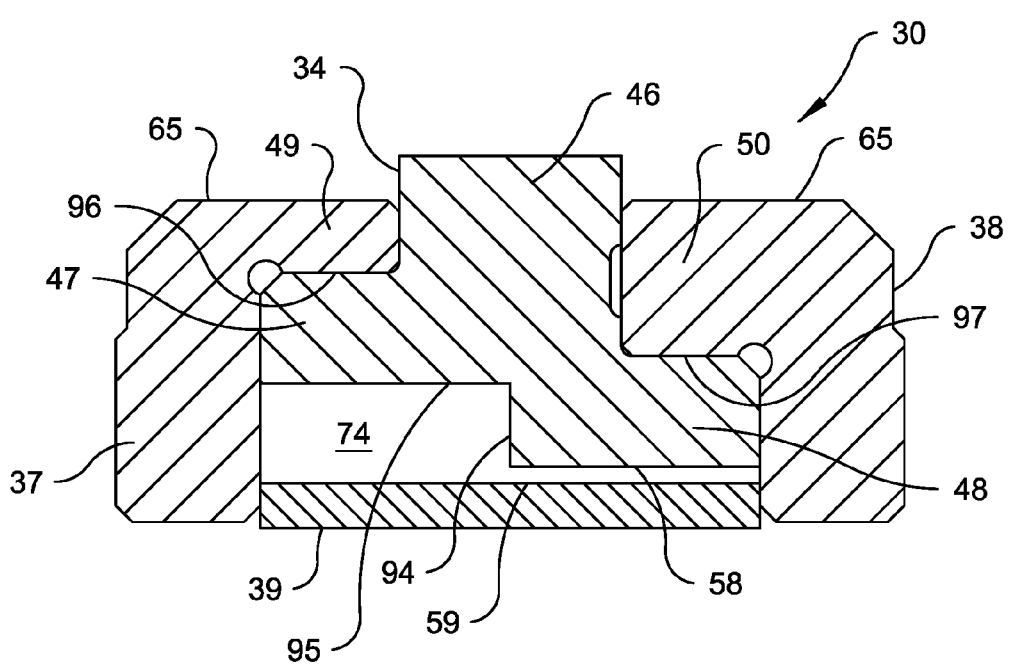
FIG. 5 is an enlarged cross section view illustrating a ring segment disposed about an inner ring between a pair of end rings whereby the sealing ring include a pair of horizontal flanges extending in an asymmetric arrangement from a vertical flange in accordance with an embodiment of the invention.

Referring now to FIG. 5, each asymmetric ring segment 34 within the seal assembly 30 includes a vertical flange 46 interposed between a pair of horizontal flanges 47, 48. The vertical flange 46 is aligned to extend in an outward radial direction so that the vertical flange 46 is substantially perpendicular to the axis of rotation 24 (the latter not shown). The horizontal flanges 47, 48 extend from the vertical flange 46 in a substantially perpendicular arrangement so that the horizontal flanges 47, 48 are substantially parallel to the axis of rotation 24 (the latter not shown). In particular, the horizontal flanges 47, 48 extend from the vertical flange 46 to form a non-symmetric arrangement whereby one horizontal flange 47 is radially offset from another horizontal flange 48 so that the horizontal flanges 47, 48 are not aligned symmetrically along a common diametrical distance from the axis of rotation 24 (the latter not shown). The vertical flange 46 and the horizontal flanges 47, 48 are arc shaped thereby defining the curvature of the asymmetric ring segment 34.

Referring again to FIG. 5, the non-symmetric arrangement of horizontal flanges 47, 48 may include a variety of configurations. For example, the asymmetric arrangement may require the left-side horizontal flange 47 to be offset above the right-side horizontal flange 48 as illustrated by way of example in FIG. 5. In other embodiments, the right-side horizontal flange 48 could be offset above the left-side horizontal flange 47. In yet other embodiments, the horizontal flanges 47, 48 may partially overlap as illustrated in FIG. 5 so that the inner surface 95 of one horizontal flange 47 is below the upper surface 97 of another horizontal flange 48. In still other embodiments, the inner surface 95 may be positioned above the upper surface 97 so that no overlap is provided between the horizontal flanges 47, 48. It is understood that other asymmetric arrangements are possible whereby the cross section of the asymmetric ring segment 34 is not symmetric due to arrangement and/or dimension(s) of the horizontal flanges 47, 48.

Referring again to FIG. 5, the end rings 37, 38 include a first flange 49 and a second flange 50, respectively. The first flange 49 extends from the end ring 37 to form a structure with an inverted L-shaped cross section. The second flange 50 extends from the end ring 38 to also form another inverted L-shaped cross section. The first and second flanges 49, 50 are oriented so as to extend in the direction of the vertical flange 46. The upper surfaces 96, 97 of each horizontal flange 47, 48 may contact the respective flanges 49, 50 as illustrated in FIG. 5 so that the vertical flange 46 extends outward from the outer annular surface 65 along each end ring 37, 38. In preferred embodiments, the radial thickness of first and second flanges 49, 50 may differ and the respective outer annular surfaces 65 may align as illustrated in FIG. 5. Regardless of the specific design features for the end rings 37, 38, it is understood that the asymmetric ring segment 34 must be movable with respect to the end rings 37, 38.

Referring again to FIG. 5, a discontinuity 94 may separate the inner surface 95 along one horizontal flange 47 from the inner surface 58 along another horizontal flange 48. The discontinuity 94 is understood to be an abrupt displacement whereby one inner surface 95 is offset from another inner surface 58. In preferred embodiments, the abrupt displacement may be radial so as to define a step-like structure along the inside surface of the asymmetric ring segment 34 as illustrated in FIG. 5. While the left-side inner surface 95 is shown above the right-side inner surface 58, it is possible in some embodiments for the right-side inner surface 58 to be above the left-side inner surface 95. In yet other preferred embodiments, the discontinuity 94 may bisect the vertical flange 46 so that the discontinuity 94 is aligned with the center of the vertical flange 46. It is believed that the discontinuity 94 facilitates a balancing of the radial force loads at the contact between the horizontal flanges 47, 48 and the first and second flanges 49, 50, respectively, so as to mitigate stress induced failure along the asymmetric ring segment 34.

Referring again to FIG. 5, the radial height of the discontinuity 94 is determined by the radial thickness of the horizontal flanges 47, 48, the radial thickness of the first and second flanges 49, 50, the offset between the horizontal flanges 47, 48, and the offset between the first and second flanges 49, 50. As such, the radial thicknesses and/or offsets for the horizontal flanges 47, 38 or the first and second flanges 49, 50 may be the same or different in order to properly balance the centrifugal loading communicated by the horizontal flanges 47, 48 onto the first and second flanges 49, 50.

Referring again to FIG. 5, the inner ring 39 is interposed between the end rings 37, 38. The inner ring 39 is separated from the asymmetric ring segment 34 by a gap 74. The minimum height of the gap 74 should be sufficient to avoid and/or minimize contact between the outer annular surface 59 along the inner ring 39 and the inner surface 58 along the asymmetric ring segment 34 during expansion and contraction of the sealing ring 33 in part or whole.

Figure 6:
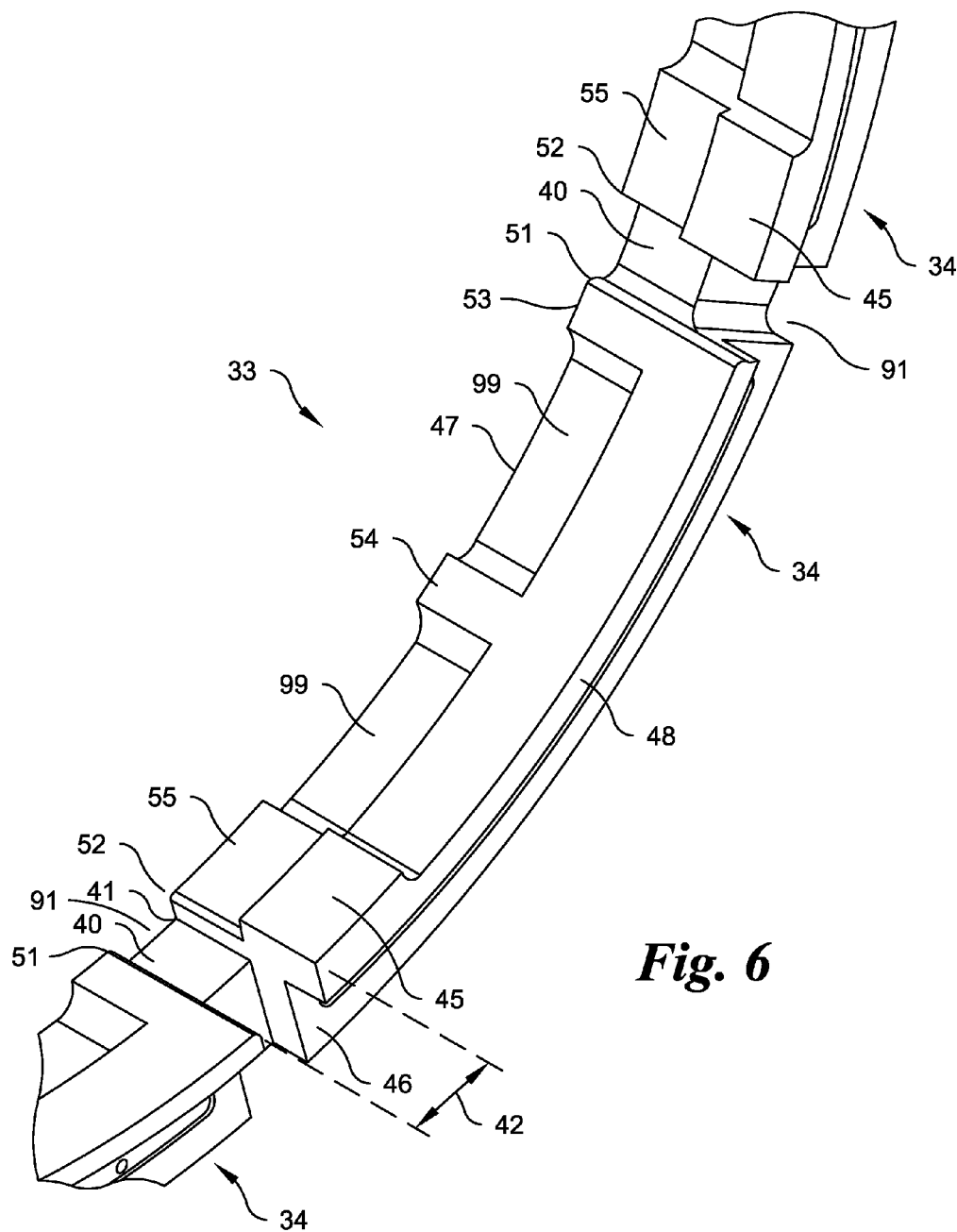
FIG. 6 is an enlarge perspective view illustrating the inner diameter surface of several asymmetric ring segments comprising a sealing ring in accordance with an embodiment of the invention.
Figure 7:
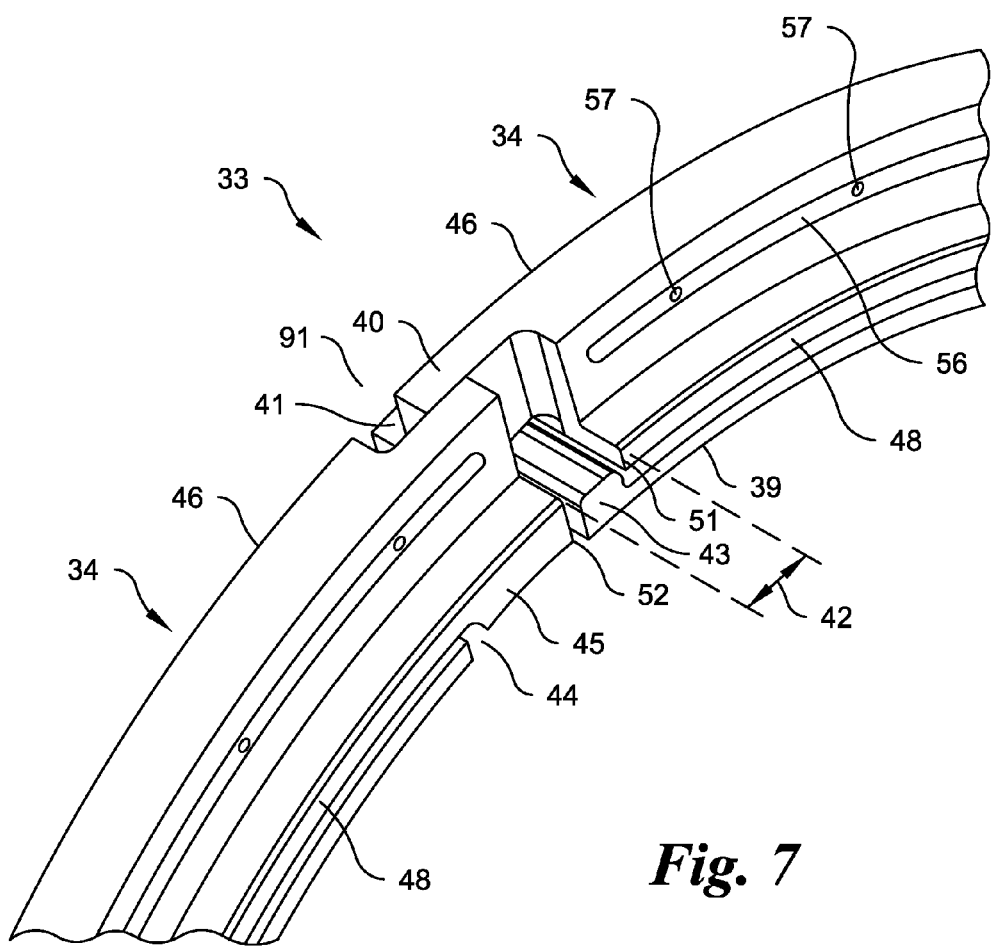
FIG. 7 is an enlarge perspective view illustrating contact between two asymmetric ring segments along a sealing ring in accordance with an embodiment of the invention.

Referring now to FIGS. 6 and 7, each asymmetric ring segment 34 includes a first end 51 and a second end 52. The first end 51 of one asymmetric ring segment 34 is positioned to abut a second end 52 of another asymmetric ring segment 34 thereby defining a joint 91. In preferred embodiments, a tongue 40 may extend from the first end 51 and a groove 41 may extend into the second end 52. The tongue 40 and the groove 41 facilitate joining and sealing between the first and second ends 51, 52 of adjoining asymmetric ring segment 34 thereby facilitating assembly of the sealing ring 33. The tongue 40 and groove 41 are configured so that the tongue 40 is insertable into and extractable from the groove 41.

Referring again to FIGS. 6 and 7, one or more ribs 53-55 may extend from the horizontal flange 48 in the direction of and across the horizontal flange 47. The ribs 53-55 and horizontal flange 48 define pockets 99 along the inner surface of each asymmetric ring segment 34. Each pocket 99 is characterized by a recess or a depression along the inner surface of the asymmetric ring segment 34. The combination of ribs 53-55 and pockets 99 may stiffen the asymmetric ring segment 34.

Referring again to FIGS. 6 and 7, a pad 45 may extend from the inner surface of each asymmetric ring segment 34 adjacent to a rib 55. The pad 45 may align with and engage a slot 44 along the inner ring 39. The pad 45 may contact one or more edges that define the slot 44 thereby providing a mechanical stop that limits or prevents relative motion between the asymmetric ring segment 34 and the inner ring 39. The pad 45 may be extendable from the slot 44 during expansion of the sealing ring 33 and may be retractable into the slot 44 during contraction of the sealing ring 33.

Referring again to FIGS. 6 and 7, the asymmetric ring segments 34 are disposed about the inner ring 39 so that adjoining asymmetric ring segments 34 abut to form the joints 91. Each joint 91 may include a gap 42 disposed between the first end 51 of one asymmetric ring segment 34 and the second end 52 of another asymmetric ring segment 34. A ridge 43 along the inner ring 39 may engage and extend along the gap 42 as illustrated in FIG. 7. The first end 51 and/or the second end 52 may contact the ridge 43 during rotation of the inner shaft 32 such that the ridge 43 provides a mechanical stop preventing relative motion between the inner ring 39 and the asymmetric ring segments 34. The ridge 43 may also act as a guide or an alignment mechanism facilitating expansion and contraction of the sealing ring 33 along a preferred radial path.

Referring again to FIGS. 6 and 7, one or more channels 57 may reside along the vertical flange 46. Each channel 57 is a hole or cavity that extends across the width of the vertical flange 46. The channel 57 may allow a fluid to pass from one side of the asymmetric ring segment 34 to the other side of the same asymmetric ring segment 34. The channel 57 may intersect a groove 56 along one or both sides of the vertical flange 46. The groove 56 may facilitate communication of a fluid into the channel 57 and/or facilitate communication of a fluid from the channel 57 onto an adjoining structure.

Figure 8:
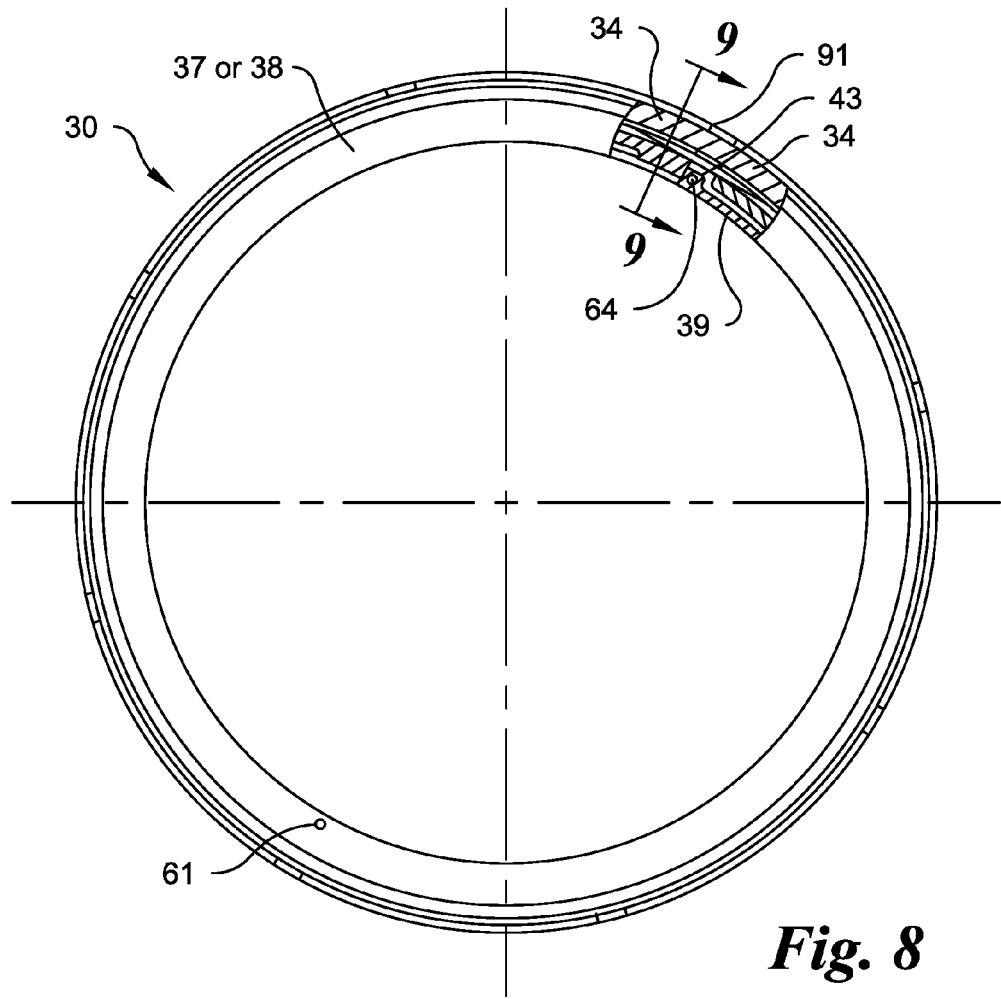
FIG. 8 is a side view with a partial cross section illustrating features at the contact between a pair of asymmetric ring segments adjacent to a ridge along an inner ring in accordance with an embodiment of the invention.

Referring now to FIGS. 4 and 8, the asymmetric ring segments 34 within the seal assembly 30 are disposed about the inner ring 39 and interposed between the end rings 37, 38. The end rings 37, 38 may be fixed to the inner ring 39 via one or more pins 60. One or more holes 64 may be positioned along the inner ring 39 so as to separately align with a like number of holes 61 along the end ring 37, 38. In preferred embodiments, the hole 64 may be located at the ridge 43 adjacent to a joint 91. A pin 60 may be inserted into a hole 61 along the end ring 37, 38 and then push into the hole 64 along the inner ring 39 so that separate portions of the pin 60 reside within both holes 61, 64. The holes 61, 64 may be dimensioned with an interference fit so that the pin 60 is secured to the end ring 37, 38 and the inner ring 39 after insertion into the holes 61, 64. In some embodiments, a pair of mutually aligned pins 60 may separately secure the end rings 37, 38 about the inner ring 39. In other embodiments, a single pin 60 may traverse the inner ring 39 and both end rings 37, 38.

Figure 9:
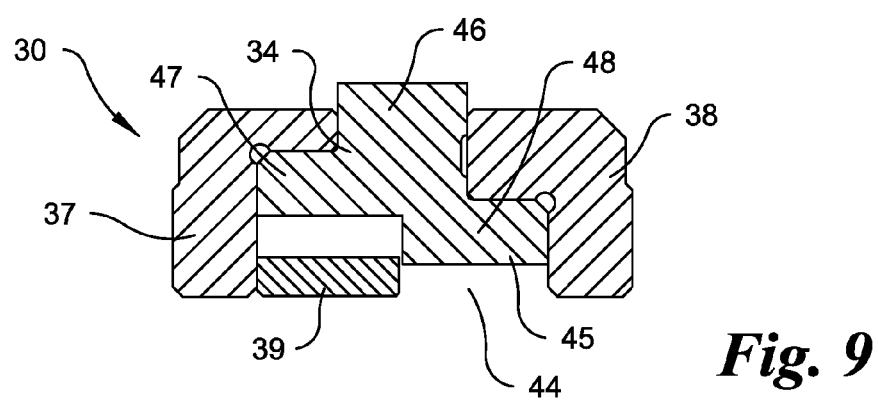
FIG. 9 is an enlarged cross section view illustrating an asymmetric ring segment adjacent to a slot along an inner ring in accordance with an embodiment of the invention.

Referring now to FIGS. 6 and 9, one or more asymmetric ring segments 34 within the seal assembly 30 may include a pad 45. The pad 45 may extends along a portion of a horizontal flange 48 and inward toward the inner ring 39. The pad 45 may align with and extend into a slot 44 along the inner ring 39. The pad 45 may be freely movable within the slot 44 thereby permitting radial movement of the asymmetric ring segment 34 with respect to the end rings 37, 38 and the inner ring 39.

Referring again to FIGS. 6 and 9, radial movement of the asymmetric ring segment 34 may permit retraction and extension of the vertical flange 46 with respect to the end rings 37, 38. By way of example, retraction of the vertical flange 46 into the seal assembly 30 may occur when an asymmetric ring segment 34 contacts the outer shaft 31 (the latter not shown). Retraction is characterized by the radial inward movement of an asymmetric ring segment 34 whereby the upper surfaces of the horizontal flanges 47, 48 separate from the respective end rings 37, 38 and the pad 45 is directed toward the slot 44. By way of example, extension of the vertical flange 46 from the seal assembly 30 may occur when an asymmetric ring segment 34 is pushed radially outward by centrifugal forces created during rotation of the seal assembly 30 by the inner shaft 32 (the latter not shown). Extension is characterized by the radial outward movement of an asymmetric ring segment 34 whereby the upper surfaces of the horizontal flanges 47, 48 move toward and seat onto the respective end rings 37, 38 and the pad 45 is directed away from the slot 44. It is understood from the description herein that one or more asymmetric ring segment 34 may be separately movable in the radial direction with respect to other asymmetric ring segments 34 in a seal assembly 30. It is also understood that all asymmetric ring segments 34 may be concurrently movable in the radial direction within a seal assembly 30.

Figure 10:
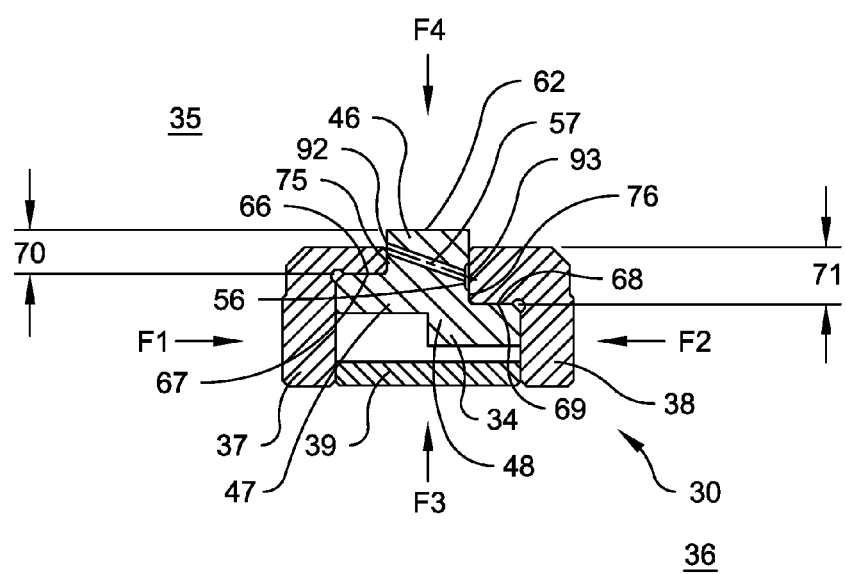
FIG. 10 is an enlarged cross section view illustrating a channel through an asymmetric ring segment in accordance with an embodiment of the invention.

Referring now to FIG. 10, each asymmetric ring segment 34 within the seal assembly 30 may include one or more channels 57 that traverse the vertical flange 46. Each channel 57 may further include an inlet end 92 and an outlet end 93. The inlet end 92 may extend at least partially above a first face 75 along one end ring 37 when an inner surface 66 along the end ring 37 contacts an outer surface 67 along the horizontal flange 47 and/or an inner surface 68 along the end ring 38 contacts an outer surface 69 along the horizontal flange 48. The outlet end 93 may terminate adjacent to a second face 76 along the other end ring 38 when the inner surface 66 along the end ring 37 contacts the outer surface 67 along the horizontal flange 47 and/or the inner surface 68 along the end ring 38 contacts the outer surface 69 along the horizontal flange 48. In some embodiments, the outlet end 93 may directly communicate with a groove 56 along the vertical flange 46. The groove 56 may align with second face 76. The preferred arrangement of the inlet and outlet ends 92, 93 with respect to the first and second faces 75, 76, respectively, ensures fluid from the higher pressure side 35 is communicated into and through the channel 57 when the asymmetric ring segment 34 is properly seated onto the end rings 37, 38 by the outward directed centrifugal forces created during rotation of the inner shaft 32.

Referring again to FIG. 10, a forward axial force F1 and an aft axial force F2 are communicated onto each asymmetric ring segment 34 during operation of a turbine engine. The forward axial force F1 is communicated onto the asymmetric ring segment 34 from the higher pressure side 35 in the direction of the lower pressure side 36. The aft axial force F2 is communicated onto the asymmetric ring segment 34 from the lower pressure side 36 in the direction of the higher pressure side 35. The opposed arrangement of the forward axial force F1 and the aft axial force F2 permits cancellation of a portion of the larger force equal to the magnitude of the smaller force. In preferred embodiments, the forward axial force F1 is equal to the aft axial force F2 so that the resultant axial force is zero and each asymmetric ring segment 34 is axially balanced within a specific range of one or more operating conditions within a turbine engine.

Referring again to FIG. 10, an outward radial force F3 and an inward radial force F4 are also communicated onto each asymmetric ring segment 34 during operation of a turbine engine. The outward radial force F3 is communicated onto the asymmetric ring segment 34 in the direction of the outer shaft 31. The inward radial force F4 is communicated onto the asymmetric ring segment 34 in the direction of the inner shaft 32. The opposed arrangement of the outward radial force F3 and the inward radial force F4 permits cancellation of a portion of the larger force equal to the magnitude of the smaller force. In preferred embodiments, the outward radial force F3 is greater than the inward radial force F4 so that the resultant radial force directs the asymmetric ring segment 34 outward toward the outer shaft 31. The asymmetry of the radial force balance ensures proper contact between the asymmetric ring segments 34 and the end rings 37, 38 within a specific range of one or more operating conditions within a turbine engine.

Figure 11A:
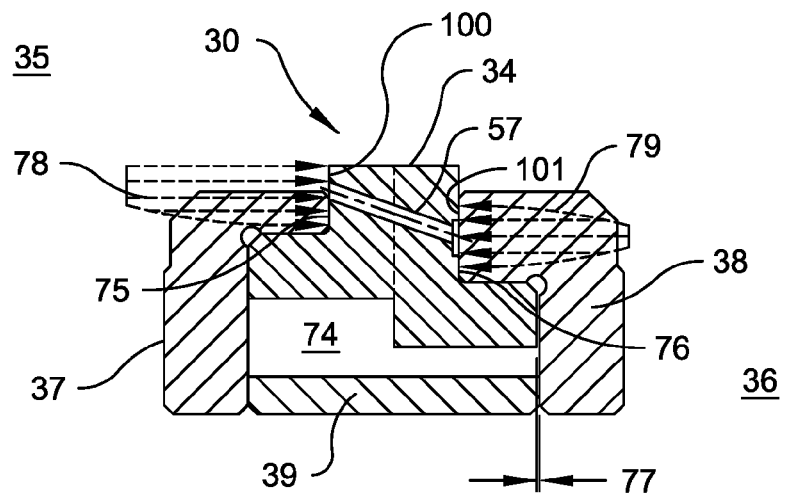
FIG. 11a is an enlarged cross section view illustrating pressure loading conditions along an asymmetric ring segment relevant to axial movement of the ring segment in accordance with an embodiment of the invention.

Referring now to FIGS. 10 and 11a, fluid originating in the higher pressure side 35 is communicated onto the forward face 100 along the vertical flange 46. The fluid impinges the forward face 100 to define a forward axial pressure 78 as illustrated by the exemplary pressure profile in FIG. 11a. The forward axial pressure 78 is distributed along a forward area 70. The forward area 70 may extend along the interface between the forward face 100 and the first face 75. The dimensions of the forward area 70 and the magnitude of the forward axial pressure 78 define the forward axial force F1.

Referring again to FIGS. 10 and 11a, fluid originating in the higher pressure side 35 is communicated into the channel 57. The fluid traverses the channel 57 and is communicated onto the second face 76. The fluid impinges the aft face 101 to define an aft axial pressure 79 as illustrated by the exemplary pressure profile in FIG. 11a. The aft axial pressure 79 is distributed along an aft area 71. The aft area 71 may extend along the interface between the aft face 101 and the second face 76. The dimensions of the aft area 71 and the magnitude of the aft axial pressure 79 define the aft axial force F2. In preferred embodiments, the forward axial force F1 may equal the aft axial force F2 so as to reduce wear along surfaces degraded by sliding contact imposed by axial load conditions.

Figure 11B:
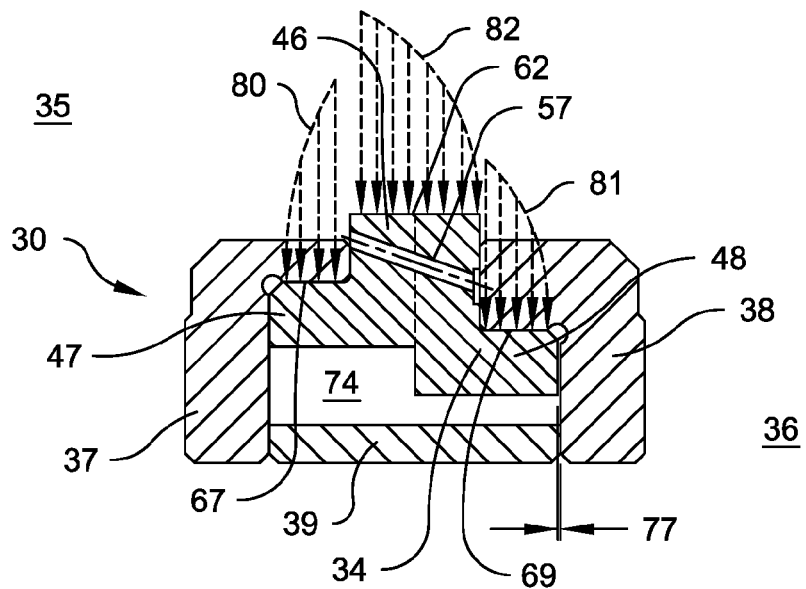
FIG. 11b is an enlarged cross section view illustrating pressure loading conditions along an asymmetric ring segment relevant to radial movement of the ring segment in accordance with an embodiment of the invention.

Referring now to FIGS. 10 and 11b, fluid originating in the higher pressure side 35 is also communicated, either directly or indirectly via the channel 57, onto surfaces that impart radial forces onto the asymmetric ring segments 34 within a seal assembly 30. In one example, fluid may impinge the outer sealing surface 62 along the vertical flange 46 to define a sealing surface radial pressure 82 as illustrated by the exemplary pressure profile in FIG. 11b. In another example, fluid may traverses gaps between the asymmetric ring segment 34 and the end ring 37 and impinge the outer surface 67 along the left-side horizontal flange 47 to define a forward radial pressure 80 as illustrated by the exemplary pressure profile in FIG. 11b. In yet another example, fluid may traverses gaps between the asymmetric ring segment 34 and the end ring 38 and impinge the outer surface 69 along the right-side horizontal flange 48 to define an aft radial pressure 81 as illustrated by the exemplary pressure profile in FIG. 11b. The inward radial force F4 is the summation of the resultant forces imposed by the forward radial pressure 80, the aft radial pressure 81, and the sealing surface radial pressure 82 onto the respective areas.

Referring again to FIGS. 10 and 11b, the outward radial force F3 is approximately equal to the centrifugal force resulting from rotation of the asymmetric ring segment 34 via the inner shaft 32. In preferred embodiments, the outward radial force F3 is greater than the inward radial force F4 so as to reduce wear along surfaces degraded by sliding contact imposed by radial load conditions.

Referring now to FIGS. 11a and 11b, a clearance 77 may be provided between the end ring 38 and each of the horizontal flange 48 and the inner ring 39 adjacent to the lower pressure side 36. The clearance 77 may provide a pathway whereby fluid entering the seal assembly 30 from the higher pressure side 35 is then released in a controlled fashion into the lower pressure side 36. The arrangement provides a continuous flow of fluid across the asymmetric ring segments 34 thereby enhancing the sealing functionality of the seal assembly 30.

Figure 12A:
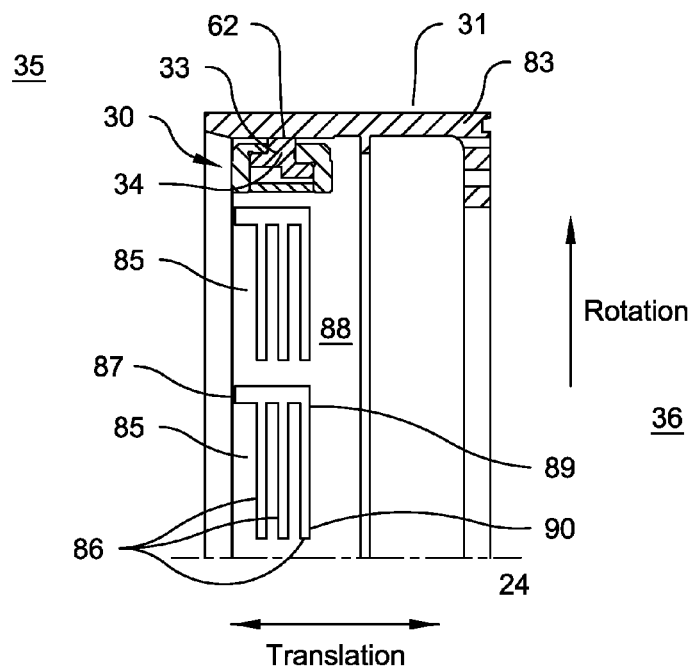
FIG. 12a is a side view with partial cross section illustrating hydrodynamic grooves disposed along the inner annular surface of an outer shaft adjacent to a seal assembly with an asymmetric sealing ring in accordance with an embodiment of the invention (features below the axis of rotation not shown).

Referring now to FIG. 12a, the runner 83 may include one or more groove sets 85 disposed along the inner annular surface 88 thereof. Each groove set 85 may include two or more grooves 86. Each groove 86 may further include an inlet end 89 and an outlet end 90 whereby fluid enters the groove 86 via the inlet end 89 and exits the groove 86 via the outlet end 90. The grooves 86 may be arranged so that the outlet end 90 of at least one groove 86 communicates fluid onto the sealing ring 33 within the seal assembly 30 during relative translation between outer and inner shafts 31, 32 (the latter not shown). In preferred embodiments, fluid may be communicated onto the outer sealing surface 62 along each asymmetric ring segment 34 to enhance the properties of the non-contact seal formed between the seal assembly 30 and the outer shaft 31.

Referring again to FIG. 12a, an inlet groove 87 may extend along the inner annular surface 88 from the higher pressure side 35 in the direction of the lower pressure side 36. The downstream end of the inlet groove 87 may intersect and communicate with the inlet end 89 of one or more grooves 86. Fluid enters the inlet groove 87 adjacent to the higher pressure side 35, thereafter traversing the inlet groove 87 and entering grooves 86 intersecting the inlet groove 87. The fluid then traverses the grooves 86 and is redirected at the outlet end 90 onto the sealing ring 33. Hydrodynamic grooves may include, but are not limited to, features described in U.S. Pat. Nos. 7,931,277, 7,963,525, and 8,091,898 each entitled Hydrodynamic Circumferential Seal System for Large Translations and U.S. Pat. No. 8,905,408 entitled Windback Device for a Circumferential Seal.

Figure 12B:
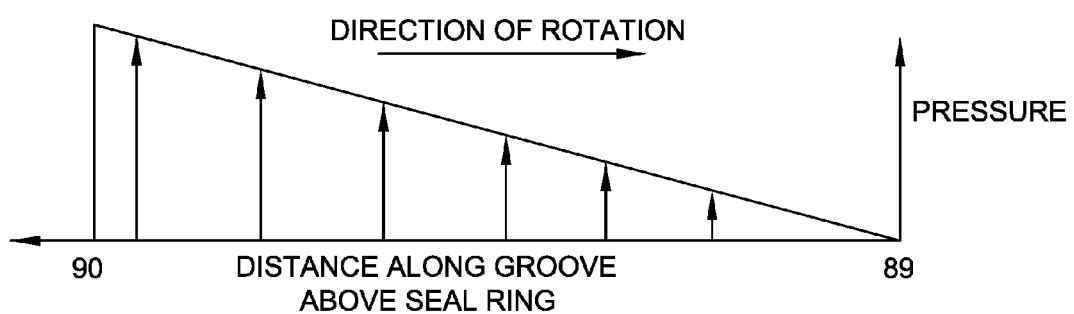
FIG. 12b is an exemplary pressure profile plot for a hydrodynamic groove in accordance with an embodiment of the invention.

Referring now to FIG. 12b, an exemplary pressure profile is shown between the inlet end 89 and the outlet end 90 of a groove 86. Other profiles are possible; however, it is understood that the pressure at the outlet end 90 is generally higher than the pressure at the inlet end 89.

As is evident from the explanation above, the intershaft seal and variations thereof described herein facilitate a non-contact seal between an outer shaft and an inner shaft. The invention is expected to be used within applications wherein a housing forms and separates a higher pressure section from a lower pressure section, and the lower pressure section must be isolated from gases originating in the higher pressure section by means of a seal system. One specific non-limiting example is a turbine engine.

The description above indicates that a great degree of flexibility is offered in terms of the present invention. Although various embodiments have been described in considerable detail with reference to certain preferred versions thereof, other versions are possible. Therefore, the spirit and scope of the appended claims should not be limited to the description of the preferred versions contained herein.

What is claimed is:

1. A seal assembly for use between an inner shaft and an outer shaft rotatable within a turbine engine comprising:
   (a) a sealing ring including a plurality of asymmetric ring segments, each said asymmetric ring segment further including:
      (i) a vertical flange; and
      (ii) a pair of horizontal flanges extending from said vertical flange in a non-symmetric arrangement, each said horizontal flange includes an inner surface, a discontinuity disposed between and separates one said inner surface from another said inner surface;
   (b) an inner ring, said sealing ring disposed about said inner ring, said inner ring including a plurality of ridges that engage said asymmetric ring segments so as to prevent rotation of said asymmetric ring segments with respect to said inner shaft; and
   (c) a pair of end rings disposed about said sealing ring and said inner ring, said horizontal flanges separately contact said end rings so that said vertical flange extends from between said end rings in the direction of said outer shaft, a non-contact seal formed between an outer sealing surface along said vertical flange and an inner sealing surface along said outer shaft.

2. The seal assembly of claim 1, wherein said inner shaft and said outer shaft counter-rotate.

3. The seal assembly of claim 1, wherein said inner shaft and said outer shaft co-rotate.

4. The seal assembly of claim 1, two adjacent said asymmetric ring segments contact along a joint.

5. The seal assembly of claim 4, wherein a tongue extends from a first end of one said asymmetric ring segment and engages a groove along a second end of another said asymmetric ring segment.

6. The seal assembly of claim 5, wherein said joint includes a gap between said first end and said second end adjacent to said tongue, one said ridge traverses at least a portion of said gap.

7. The seal assembly of claim 1, further comprising:
   (d) a plurality of slots separately disposed along said inner ring adjacent to said ridges; and
   (e) a pad extending radially inward from one said horizontal flange along each said asymmetric ring segment adjacent to each said slot.

8. The seal assembly of claim 1, further comprising:
   (d) at least one channel which traverses said vertical flange along said asymmetric ring segment, each said channel including an inlet and an outlet, said inlet disposed at least partially above a first face along one said end ring and communicable with a higher pressure side, said outlet communicable with a second face along another said end ring adjacent to said lower pressure side.

9. The seal assembly of claim 1, wherein a first face along one said end ring ensures a forward axial pressure communicates a forward axial force onto said asymmetric ring segment, a second face along another said end ring ensures an aft axial pressure communicates an aft axial force onto said asymmetric ring segment.

10. The seal assembly of claim 9, wherein said forward axial force is equal to said aft axial force.

11. The seal assembly of claim 1, wherein said discontinuity arranged to bisect said vertical flange.

12. The seal assembly of claim 1, said inner sealing surface includes at least one groove set.

13. The seal assembly of claim 12, wherein said groove set includes at least two grooves, said grooves disposed along said inner sealing surface so that at least one said groove communicates gas onto said outer sealing surface along said vertical flange as said inner shaft translates with respect to said outer shaft.

14. The seal assembly of claim 13, wherein an inlet groove communicates with each said groove.

15. The seal assembly of claim 12, wherein said groove set includes at least two grooves, said grooves disposed along said inner sealing surface so that at least one said groove communicates gas onto said outer sealing surface along said vertical flange as said outer shaft translates with respect to said inner shaft.

16. The seal assembly of claim 15, wherein an inlet groove communicates with each said groove.

17. The seal assembly of claim 1, wherein said inner ring contacts said inner shaft.

18. The seal assembly of claim 1, wherein said inner ring is secured to at least one said end ring via at least one pin.

19. The seal assembly of claim 18, wherein each said pin engages a hole along said ridge.

* * * * *